United States Patent
Sekine et al.

(10) Patent No.: US 8,928,899 B2
(45) Date of Patent: Jan. 6, 2015

(54) WEB SERVICES PRINTER DRIVER

(75) Inventors: Hitoshi Sekine, Los Altos, CA (US);
Senthil Selvaraj, Snoqualmie, WA (US);
Zhenning Xiao, Renton, WA (US);
Yaotian Wang, East Palo Alto, CA (US)

(73) Assignee: Ricoh Company, Ltd., Tokyo (JP)

( * ) Notice: Subject to any disclaimer, the term of this patent is extended or adjusted under 35 U.S.C. 154(b) by 584 days.

(21) Appl. No.: 13/034,572

(22) Filed: Feb. 24, 2011

(65) Prior Publication Data
US 2012/0218576 A1    Aug. 30, 2012

(51) Int. Cl.
*G06F 3/12* (2006.01)
(52) U.S. Cl.
CPC .............. *G06F 3/1204* (2013.01); *G06F 3/122* (2013.01); *G06F 3/1226* (2013.01); *G06F 3/1277* (2013.01); *G06F 3/1228* (2013.01); *G06F 3/1227* (2013.01); *G06F 3/1205* (2013.01); *G06F 3/1247* (2013.01); *G06F 3/1232* (2013.01); *G06F 3/1289* (2013.01)
USPC .......................................... 358/1.13; 358/1.1
(58) Field of Classification Search
USPC ................................. 358/1.13, 1.1
See application file for complete search history.

(56) References Cited

U.S. PATENT DOCUMENTS

| | | | | |
|---|---|---|---|---|
| 2003/0184782 A1* | 10/2003 | Perkins et al. | | 358/1.13 |
| 2004/0001217 A1* | 1/2004 | Wu | | 358/1.15 |
| 2004/0130746 A1* | 7/2004 | Wu | | 358/1.15 |
| 2009/0063718 A1* | 3/2009 | Sekine et al. | | 710/8 |

* cited by examiner

*Primary Examiner* — Martin Mushambo
(74) *Attorney, Agent, or Firm* — Hickman Palermo Truong Becker Bingham Wong LLP; Edward A. Becker

(57) ABSTRACT

An approach is provided for printing electronic documents that provides support for all types of printer models and PDL. A printer driver is configured to interact with Web print services that provide model-specific device capabilities and render PDL on behalf of the printer driver. A printer driver receives application data from an application program. The printer driver causes the application data to be transmitted to one or more Web print services that render the application data and generate print data in a format supported by a specified printing device. The printer driver receives the print data from the one or more Web print services and causes the print data to be transmitted to the specified printing device, wherein processing of the print data at the specified printing device causes a printed version of the electronic document to be generated.

18 Claims, 8 Drawing Sheets

500 

FIG. 5

| Options | Values | Comment | Default Value |
|---|---|---|---|
| PageSize | "Letter", "Legal", "A4" | This field MUST always be specified. | N/A |
| landscape | (an empty string) | Landscape mode. For portrait mode, don't specify this Option. | N/A |
| number-up | "1", "2", "4" (string format) | | "1" |
| page-ranges | (examples: "1", "1-4", "1-4,7,9-12") | | All pages |
| sides | "one-sided", "two-sided-long-edge", "two-sided-short-edge" | Duplex | "one-sided" |
| Collate | "True", "False" | | "False" |
| copies | (a string representing a numeric number) | Valid value is 1-99, inclusive | "1" |
| fitplot | (an empty string) | Fit content to page. | N/A |
| pdl | (an array of strings) Each string can be one of these values: "PS", "PCL", "PXL", "PDF" | If this option is not specified, or an empty array is, a default PDL will be used by the Cumulus Server. "PCL" denotes PCL5. "PXL" denotes PCL6 (preferred) or PCL5. | What is available in driver database |

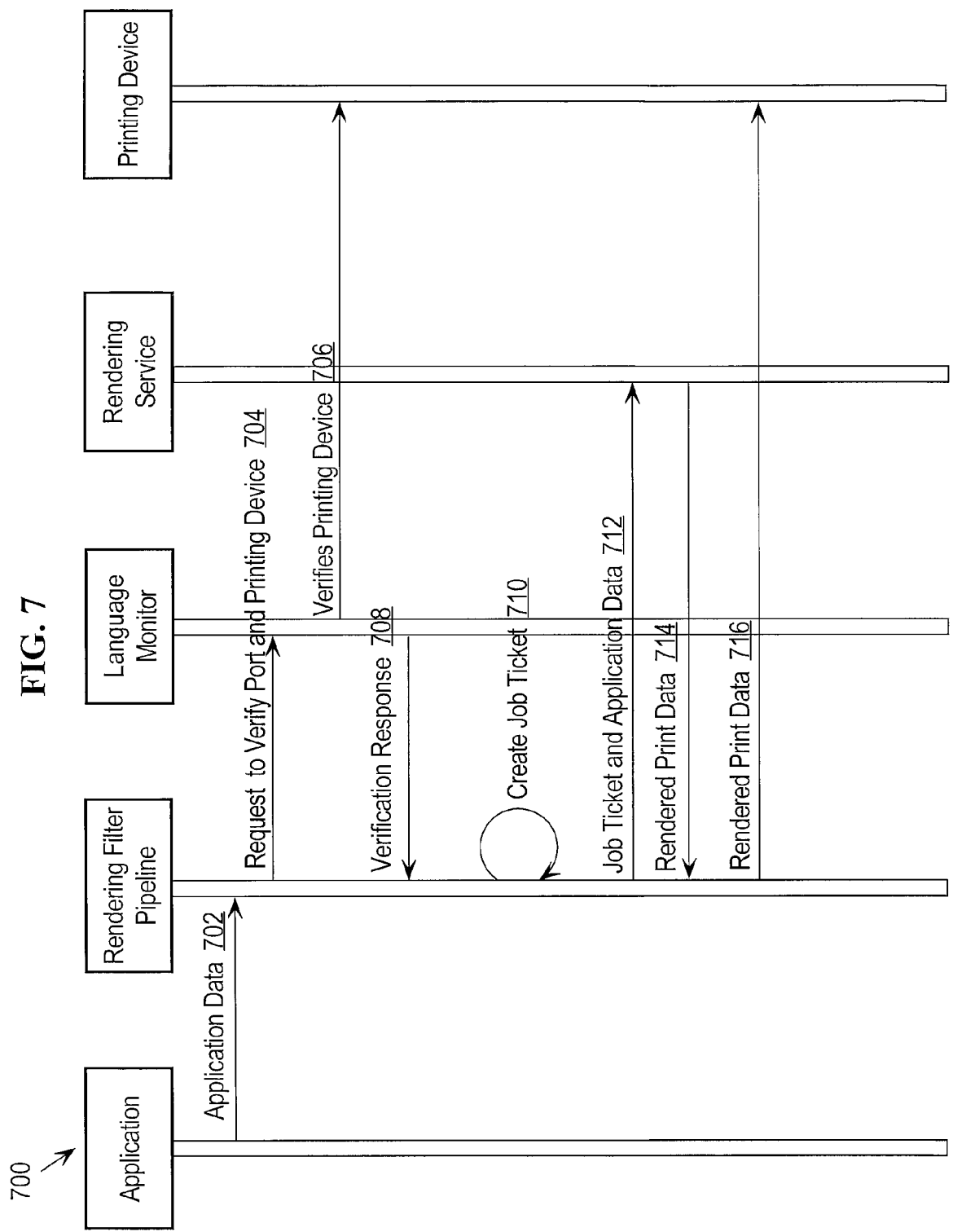

| API | Brief Description |
|---|---|
| SignIn | Sign a user into the Web Print Services Server, initiating a session. This enables other API marked by (*) to be used while the session is active. |
| SignOut | Sign out the user from the Web Print Services Server, terminating the session. |
| GetDevicesImages * | Obtain a picture of a printer device. |
| GetDevicePullPrintSupport * | Check if Web Print Services Server can support Pull Print with a printer device. |
| IsDeviceSupported * | Check if Web Print Services Server can work with a printer device (able to provide Preview and Render services). |
| GetDevicesInfo * | This is a shortcut API bundling together the functionality of GetDevicesImages, GetDevicePullPrintSupport and IsDeviceSupported. |
| PutDocument * | Upload a document or document reference to the Web Print Services Server, to be used as the target for other API such as preview and render. |
| CancelDocument * | Cancel an uploaded document. |
| GetDeviceCapabilities * | Obtain a capabilities file of a device. |
| PreviewPrintJob * | Select a printer and some job settings, generate print preview of an upload document. The preview consists of a series of images (PNG). |
| RenderPrintJob * | Generate a render of an uploaded document based on selected printer and job settings. The render can then be sent to the printer for printing. |
| RegisterUser | Register for a new user account (requires a valid user email address). |
| ConfirmUser | Confirm a newly-registered user account. |

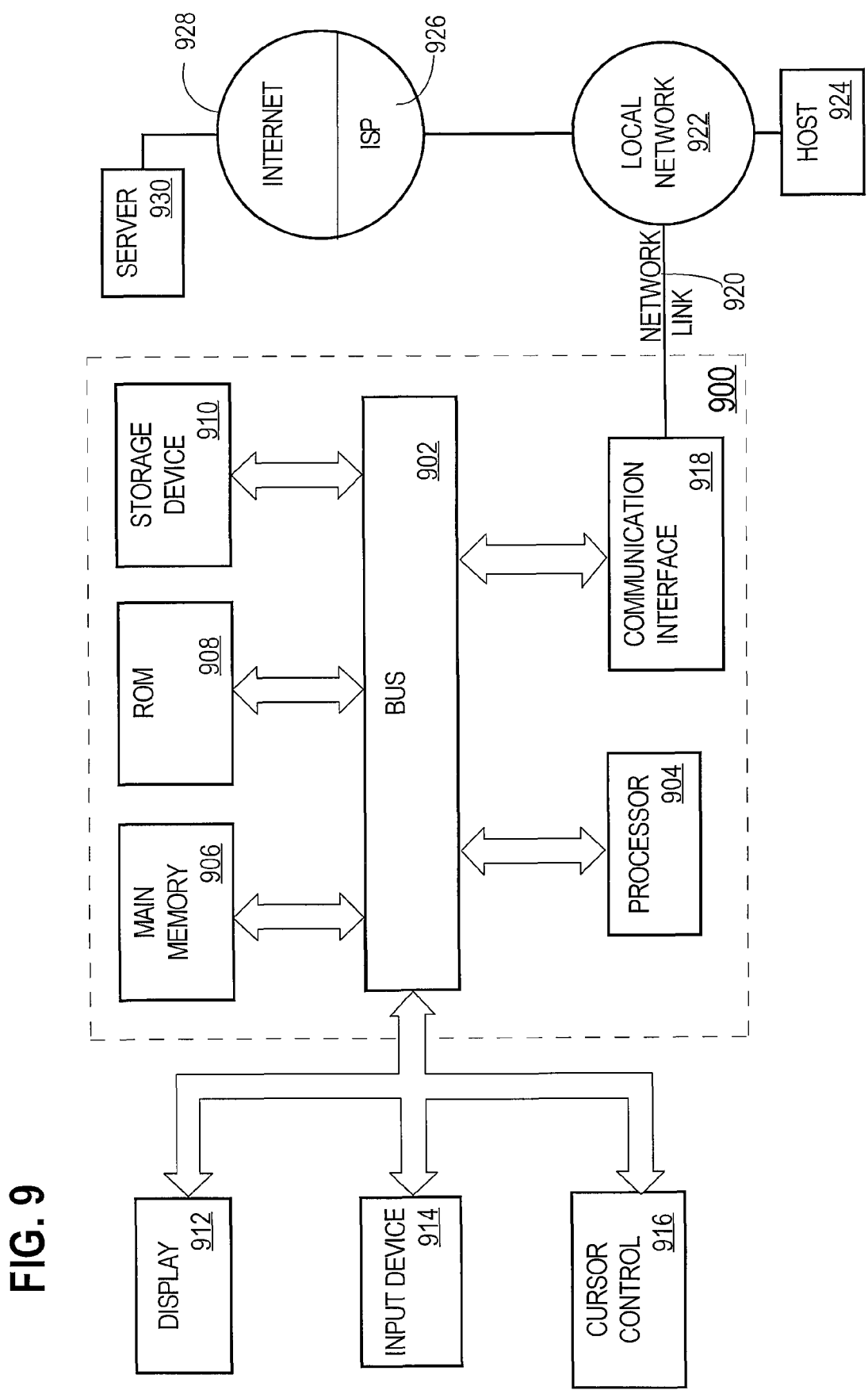

WEB SERVICES PRINTER DRIVER

FIELD OF THE INVENTION

The present invention relates to using Web services to print electronic documents, and more specifically, to a printer driver configured to use Web print services to render application data.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

When a user requests the printing of an electronic document a print subsystem on the user's client device processes the electronic document to generate print data. The print data generated by the subsystem, which is a rasterized version of the electronic document, is then sent to a printing device for printing. This rasterized print data includes all of the information required by the printing device to generate a printed version of the electronic document reflected in the print data.

For example, a user creates an electronic document using a word processing application on a PC. The user then selects a print option in the word processing application to request that the electronic document be printed at a particular printer. The print subsystem on the PC processes the electronic document to generate rasterized print data in a format supported by the particular printer, and sends the rasterized print data to the particular printer.

Generating print data conventionally involves the use of a model-specific printer driver that is specific to the target printing device. The model-specific printer driver converts data into a format supported by the target printing device. Therefore, in order for a client device to correctly print to a particular printing device using this conventional printer driver system, the client device must have installed on it a current printer driver that is specific to the particular printing device. A model-specific printer driver for each printing device must be installed on the client device.

Locating and installing model-specific printer drivers can be difficult and time-consuming. Furthermore, if the capabilities of a printing device changes, then it may be necessary to generate and distribute a new model-specific printer driver to a large number of users that have an outdated version of the model-specific printer driver. Also, model-specific printer drivers are not always available for all operating systems.

One approach for addressing the issues related to model-specific printer drivers is to use a generic printer driver that supports a reduced set of printer features, but which is designed to work with a set of printer models that support the reduced set of printer features. This allows a user to install a generic printer driver that will work with several printer models. Some of the disadvantages of generic printer drivers are that they support a reduced set of printer features, are typically vendor specific and only work with a specific type of Page Description Language (PDL), such as PostScript or low-level Printer Command Language (PCL).

Another approach for addressing the issues related to model-specific printer drivers is to use a universal printer driver that supports multiple printer models, but for a particular PDL. Although universal printer drivers typically support only a particular PDL, they usually support a superset of features, so that users can use all of the features of the printing devices. One of the disadvantages of universal printer drivers is that they often do not support new features added to existing printing devices or included with new printing devices. A universal printer driver has to be updated to support features that were not implemented at the time the universal printer driver was installed. Also, some universal printer drivers are vendor specific and so not support other vendors' printers, even though they may use the same PDL.

SUMMARY

An approach is provided for printing electronic documents that provides support for all types of printer models and PDL. A printer driver is configured to interact with Web print services that provide model-specific device capabilities and render PDL on behalf of the printer driver. A printer driver receives application data from an application program. The printer driver causes the application data to be transmitted to one or more Web print services that render the application data and generate print data in a format supported by a specified printing device. The printer driver receives the print data from the one or more Web print services and causes the print data to be transmitted to the specified printing device, wherein processing of the print data at the specified printing device causes a printed version of the electronic document to be generated. The Web services printer driver described herein allows users to use all of the features and options supported by multiple printing devices without having to install and maintain a model-specific printer driver for each printing device. In addition, the printer driver does not have to be reinstalled or updated if the capabilities of a printing device change.

BRIEF DESCRIPTION OF THE DRAWINGS

The present invention is illustrated by way of example, and not by way of limitation, in the figures of the accompanying drawings and in which like reference numerals refer to similar elements and in which:

FIG. 5 is a table that depicts an example format for a job ticket.

FIG. 7 is a message ladder diagram that depicts the flow of messages during the rendering of print data using Web print services.

FIG. 8 depicts example APIs used by WSPD to access Web print services.

FIG. 9 is a block diagram of a computer system on which embodiments of the invention may be implemented.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Various aspects of the invention are described hereinafter in the following sections:

I. OVERVIEW
II. WEB SERVICES PRINTER DRIVER ARCHITECTURE
III. PRINTING USING WEB PRINT SERVICES
IV. EXAMPLE IMPLEMENTATION OF WEB SERVICES PRINTER DRIVER
V. UI CONFIGURATION MODULE
  A. Printing Device-Specific Page Size Rendering
  B. UI Constraints
VI. COMPONENTS OF UI CONFIGURATION MODULE
  A. Printing device installation module
  B. Custom Property Sheets Module
  C. Capability Service Query Module
  D. Semantic Capability Parser
  E. DEVMODE Generation and Validation Module
  F. Preferred Printer List (PP List) UI Management Module
  G. Auto-Configure/Upgrade Module
  H. Print Schema Provider
VII. COMPONENTS OF RENDERING FILTER PIPELINE
VIII. OTHER COMPONENTS
  A. Language Monitor
  B. Core Driver GPD File
IX. OPERATIONAL EXAMPLES
  A. Printing Device Capability Data
  B. Rendering Print Data Using Web Print Services
X. EXAMPLE INTERFACES
XI. IMPLEMENTATION MECHANISMS

I. Overview

An approach is provided for printing electronic documents that provides support for all types of printer models and PDL. A printer driver is configured to interact with Web print services that provide model-specific device capabilities and render PDL on behalf of the printer driver. A printer driver receives application data from an application program. The printer driver causes the application data to be transmitted to one or more Web print services that render the application data and generate print data in a format supported by a specified printing device. The printer driver receives the print data from the one or more Web print services and causes the print data to be transmitted to the specified printing device, wherein processing of the print data at the specified printing device causes a printed version of the electronic document to be generated. The Web services printer driver described herein allows users to use all of the features and options supported by multiple printing devices without having to install and maintain a model-specific printer driver for each printing device. In addition, the printer driver does not have to be reinstalled or updated if the capabilities of a printing device change.

II. Web Services Printer Driver Architecture

Figure 1:
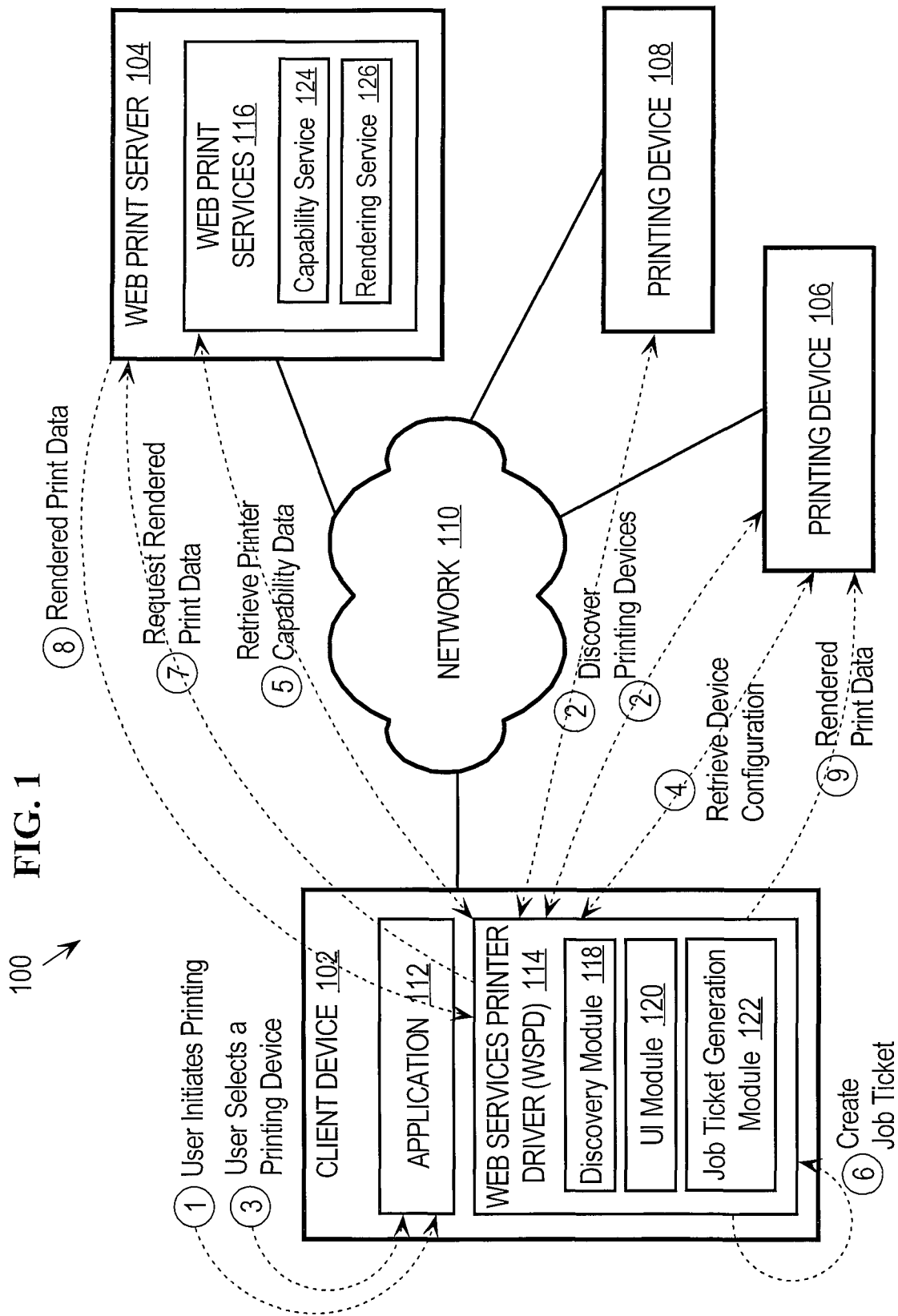
FIG. 1 is a block diagram that depicts an example network arrangement 100 for processing print data using a Web services printer driver.

FIG. 1 is a block diagram that depicts an example network arrangement 100 for processing print data using a Web services printer driver, according to an embodiment of the invention. Example network arrangement 100 includes a client device 102, a Web print server 104 and printing devices 106, 108, communicatively coupled via a network 110.

Client device 102 may be implemented by any type of client device. Example implementations of client device 102 include, without limitation, workstations, personal computers, laptop computers, personal digital assistants (PDAs), cellular telephony devices, and any type of mobile devices. In network arrangement 100, client device 102 is configured with an application 112 and a Web services printer driver (WSPD) 114. Application 112 may be any type of application process. Examples of application 112 include, without limitation, a word processor, a spreadsheet program, an email client, etc. Client device 102 may be configured with other mechanisms, processes, and functionality, depending upon a particular implementation.

WSPD 114 is a printer driver that is configured to use Web print services 116 to render application data into PDL for a target printing device. WSPD 114 may include a variety of elements and functionality, depending upon a particular implementation. For example, as depicted in FIG. 1, WSPD 114 may include a discovery module 118, a user interface (UI) module 120 and a job ticket generation module 122. Discovery module 118 discovers available printing devices, such as printing devices 106, 108, and may also obtain specified information from discovered printing devices, for example identification data and basic capability data. UI module 120 generates a graphical user interface based upon printing device capability data. Job ticket generation module 122 generates job tickets based upon printing device capability data and user selections of features and options. WSPD 114 may also include the capability to render PDL, depending upon and particular implementation, and client device 102 may include one or more other printer drivers that are configured to render PDL for particular printing devices.

Web print services 116 reside on Web print server 104. Web print server 104 may be implemented as any type of network device that is communicatively coupled to network 110. Web print services 116 may be implemented by one or more services that render application data into PDL data on behalf of WSPD 114. For example, as depicted in FIG. 1, Web print services 116 may include a capability service 124 and a rendering service 126. Capability service 124 provides to WSPD 114 printing device capability data that indicates installed options and features of printing devices. Rendering service 126 renders PDL data on behalf of WSPD 114. Upon installation, WSPD 114 is configured to communicate with Web print services 116 and in particular, capability service 124 and rendering service 126. This may include specifying a server name, along with authentication information, such as a user name and password.

Printing devices 106, 108 may be implemented by any type of device that is capable of processing print data received from client device 102 and generating printed versions of electronic documents reflected in the print data. For example, printing devices 106, 108 may be a multi-function peripheral (MFP) that includes any combination of printing, copying, facsimile and scanning capability, etc. Any number of devices, including printing devices, client devices, and other devices, may be included in the network.

Network 110 may be implemented with any type of medium and/or mechanism that facilitates the exchange of information between client device 102, Web print server 104 and printing devices 106, 108. Furthermore, network 110 may use any type of communications protocol and may be secured or unsecured, depending upon the requirements of a particular application.

III. Printing Using Web Print Services

The use of Web print services to process print data is now described with reference to FIG. 1. At Step 1, a use initiates printing of an electronic document via application 112, for example, by selecting a print option from a menu of application 112. In Step 2, WSPD 114 discovers printing devices available on network 110. For example, the discovery module 118 may use Web services to discover printing devices 106, 108. Once the printing devices are discovered, WSPD 114 may communicate the available printing devices to a user, for example, by displaying a list of the available printing devices. In Step 3, the user selects a particular printing device to which the electronic document will be printed. In this example, it is presumed that the user selected printing device 106 for printing.

In Step 4, WSPD 114 retrieves the configuration of printing device 106. The configuration may be indicated by configuration data that specifies basic information about printing device 106, for example, one or more of a model identification, a device identification and the particular PDL supported by printing device 106. WSPD 114 may obtain the configuration of printing device 106 via, for example, by querying printing device 106.

In Step 5, printing device capability data for printing device 106 is retrieved from Web print services 116. The printing device capability data indicates currently installed features and options on printing device 106. Examples of installed features include, without limitation, paper type and duplex, as well as finishing options such as stapling. Options are values for the features. Example options for paper type are 8½ by 11, A4, etc. The print capability data also includes constraints and dependencies for the features and options. One example of a constraint is a set of valid options for a specified feature. One example of a dependency is that duplex printing may only be available for specified paper types, e.g., not available when printing on transparencies. The print capability data may also specify the PDL supported by the printing device. The printing device capability data may be provided to WSPD 114 in a variety of formats that may vary depending upon a particular implementation. Example file types include, without limitation, a Postscript Printer Description (PPD) file and a Web services device (WSD) file. An example format is XML. WSPD 114 may specify a particular file type and/or format in the request sent to Web print services 116. The UI module 120 generates a graphical user interface for the printing device 106 based upon the printing device capability data. The graphical user interface displays the features and options supported by printing device 106 and allows a user to specify particular features and options to be used to print the electronic document.

In Step 6, the job ticket generation module 122 generates a job ticket based upon the printing device capability data and the user's selections of features and options. The job ticket indicates how the electronic document is to be printed by the printing device 106 for this user. The job ticket may be in a wide variety of formats, depending upon a particular implementation. One example format is XML.

In Step 7, WSPD 114 requests that Web print services 116 render the print job. For example, WSPD 114 sends the application data and the job ticket to the rendering service 126 with a request to render the application data. The application data may be provided to the rendering service 126 in a wide variety of formats, depending upon a particular implementation. For example, the application data may be provided in a native format of the application that generated the application data, or other portable formats, such as PDF or XPS. WSPD 114 may also send device configuration data that indicates the current device configuration of printing device 106. The job ticket and the device configuration data provide rendering service 126 provide the information necessary for the rendering service 126 to generate print data, in a format supported by printing device 106, which when processed by printing device 106, will cause the electronic document to be printed on printing device 106 using the features and options specified by the user. Rendering service 126 may invoke one or more printer drivers to generate the rendered print data.

In Step 8, Web print services 116 supplies the rendered print data to WSPD 114. Alternatively, Web print services 116 may supply location information that WSPD 114 can use to retrieve the rendered print data. For example, Web print services 116 may supply a link, such as a URL, to WSPD 114 and WSPD 114 then uses the link to retrieve the rendered print data. In Step 9, WSPD 114 transmits the rendered print data to printing device 106. Printing device 106 processes the rendered print data and causes the electronic document to be printed using the features and options selected by the user. In this example, WSPD 114 uses Web print services 116 to generate the rendered print data. WSPD 114 may also be configured to render print data for one or more printing devices and this capability may be selectable by a user, for example, via a graphical user interface generated by WSPD 114. The approach is also applicable to situations where client device 102 is directly connected to printing device 106. In these situations, WSPD 114 provides the rendered print data directly to printing device 106.

IV. Example Implementation of Web Services Printer Driver

Figure 2:
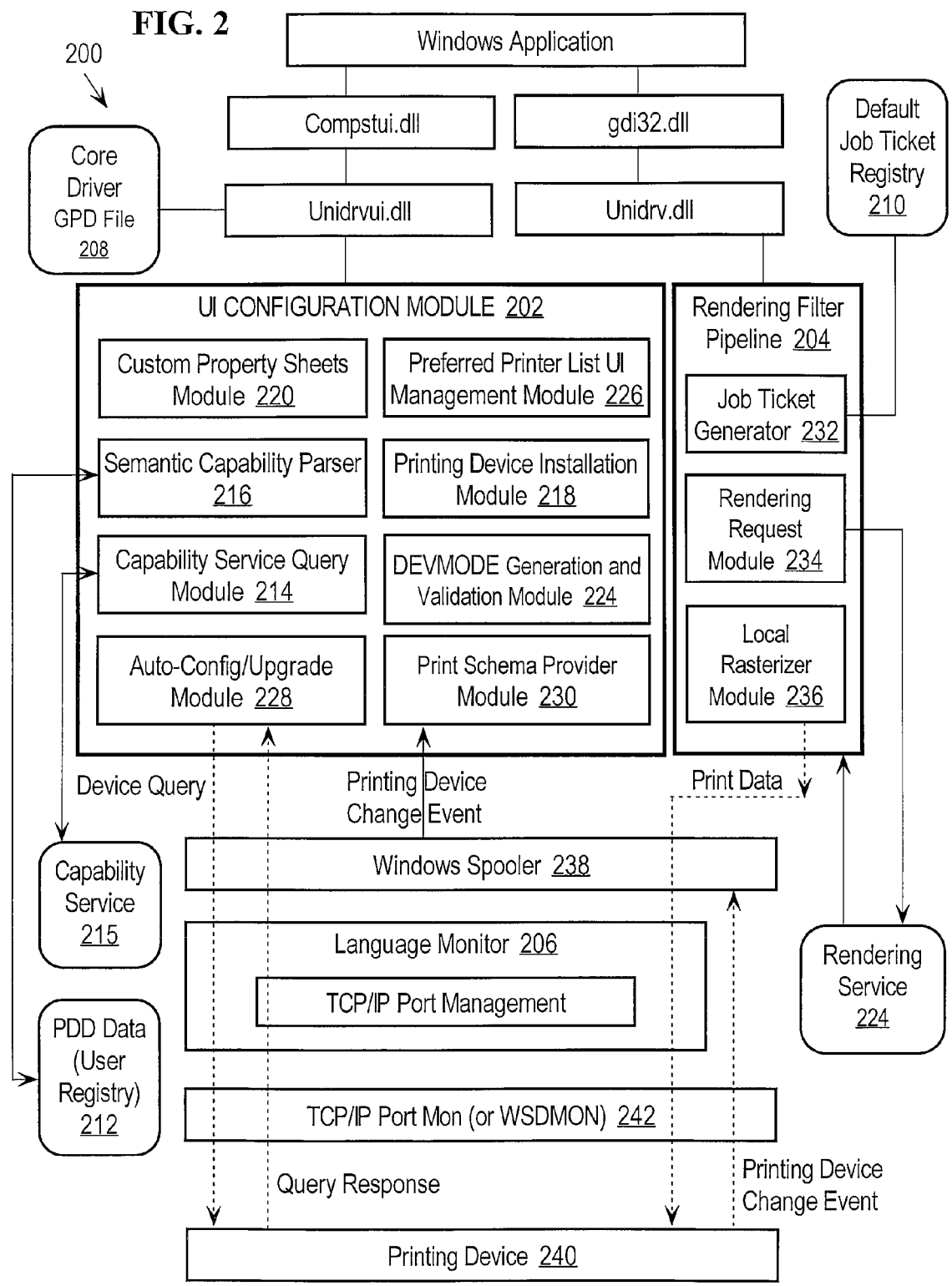
FIG. 2 is a block diagram that depicts example components of the WSPD driver package and their relationship to other components within a MS Windows environment.

The implementation of WSPD 114 may vary depending upon a variety of factors, such as the architecture and platform of client device 102. In one example implementation, WSPD 114 is implemented as a WSPD driver package developed as a plug-in for Microsoft XPS Driver (XPSDRV) that provides XPS job rendering capability by working with XPSDrv, Windows Spooler, and the web prints services (If Selected by User) under MS Windows environment. FIG. 2 is a block diagram that depicts example components of the WSPD driver package and their relationship to other components within a MS Windows environment. The components of the WSPD driver package include a UI configuration module 202, a rendering filter pipeline 204, a language monitor 206, a core driver GPD file 208 and a filter pipeline configuration file 210. Each of these components is described in more detail hereinafter.

V. UI Configuration Module

UI configuration module 202 is a user interface dynamic linked library (DLL) that supports dynamically displaying a UI for a printing device based on printing capabilities downloaded from Web print services 116, e.g., capability service 124, and also provides customized property sheets to display device features and options. UI configuration module 202 provides the following functionalities for printing under Windows OS:

Query, parse, and save the printing device capability data from Web print services 116
    Provide customized property sheets that display printing device features and options
    Generate default DEVMODE
    Validate DEVMODE passed in from outside
    Save a default job ticket to default job ticket registry 210
    Detect, add and register new media sizes as new forms
    Generate and validate print schema documents according to DEVMODE Allow one printing preference UI from multiple printing devices Allow users to select a default printing device from a user-defined preferred printing driver list Display and manage the preferred printing driver list UI configuration module 202 is part of the WSPD core driver package that includes core driver GPD file 208 that defines common features for all printing devices. These common features include basic media type, color mode and resolution. During normal printing operations, UI configuration module 202 works together with core driver GPD file 208 to provide a normal user interface for a printer driver. UI configuration module 202 display more features from the Web print services 116 server device and may overwrite the common features contained in core driver GPD file 208. For example, the resolution feature in core driver GPD file 208 defines three resolution options: 1200, 600 and 300 DPI and the UI configuration module 202 filters these options if a printing device supports only a subset of these resolution options. UI configuration module 202 displays printing device features by reading feature information from a registry entry named "Printer Description Data (PDD)". PDD data 212 is generated by a capability service query module 214 when the printing device is installed to preferred printing device list. Capability service query module 214 retrieves printing device capability data from capability service 215. A semantic capability parser 216 parses the printing device capability data and generates PDD data 212. If capability service query module 214 is unable to obtain printing device capability data for a particular printing device, then UI configuration module 202 displays minimum set of common features defined in the core driver GPD file 208.

A. Printing Device-Specific Page Size Rendering

The core driver GPD file 208 specifies a set of basic common paper sizes that are used if the printing device capability data for a particular printing device is not available. If the printing device capability data is available for a particular printing device, then during installation, UI configuration module 202 registers the paper sizes as a Windows form associated with the particular printing device. The form information such as "PrintableArea", "Size" and "DisplayName" are obtained from the printing device capability data. When printing device capability data is available for a particular printing device, UI configuration module 202 may ignore the paper sizes from the core driver GPD file 208 and use the paper sizes specified in the printing device capability data. When a particular printing device is uninstalled, WSPD 114 may remove all forms registered during installation time.

B. UI Constraints

UI configuration module 202 includes the capability to constrain the selection of certain printer options associated with printer features. Three categories of constraints may be associated with a feature when generating PDD data 212. These include constraints, invalid combinations and conflict resolution. A "constraint" is specified in the option level of a feature and indicates that if the current option is selected, the option defined by the "constraint" directive is not selectable. Multiple "constraint" directives defined under one option are mutually independent. An "InvalidCombinationFeature" is embedded in "InvalidCombinations" and defines features that cannot be selected at the same time. The following example code implements an invalid combination constraint for a particular combination of features and options:

```
<InvalidCombinations>
<InvalidCombinationFeature="SlipSheet"Option="ON"/>
<InvalidCombinationFeature="InputBins"Option="Bypass"/>
<InvalidCombinationFeature="SlipSheetInputBin"Option="Bypass"/>
</InvalidCombinations>
```

This example code indicates that "SlipSheet" feature with the option of "ON", the "InputBins" feature with the options of "Bypass" and the "SlipSheetInputBin" feature with the option of "Bypass" cannot be selected at the same time. A "DisabledFeatures" tag indicates that if a current option is selected, a list of whole feature will be disabled.

When enforcing the conflicting features, UI configuration module 202 maintains an internal hierarchy list that specifies a priority order for each feature. A feature with a higher priority is validated against any associated constraints before features with lower priorities. UI configuration module 202 assigns a conflict priority to a feature in the following order:

1. Device features (such as DuplexUnit, Finisher Trays, etc.)
2. Printer document or job related features, such as Collate, staple, etc.
3. Within each category of features, the priority is defined according to the "DisplayOrder" section.
4. Within each category of features, a feature with a specified "ConflictPriority" number has a higher priority than a feature that does not have a specified "ConflictPriority" number.
5. Within each category of features, if two features define a "ConflictPriority" value, the feature with a smaller or lower value has higher priority.

VI. Components of UI Configuration Module

An overview of the components of UI configuration module 202 is provided below, followed by a more detailed explanation of each component.

A. Printing Device Installation Module

Figure 3:
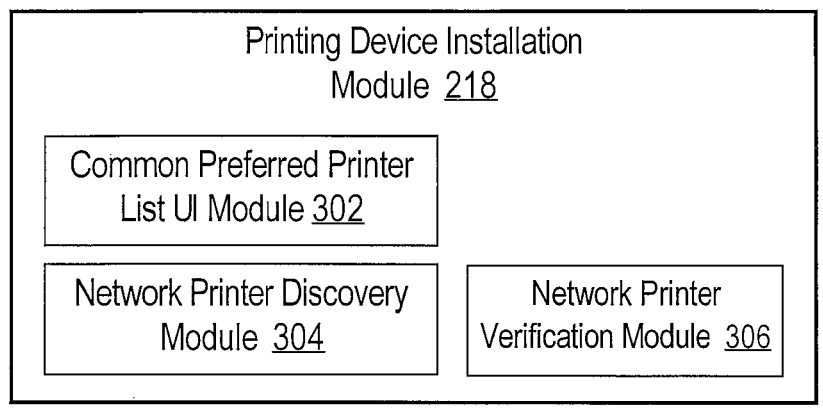
FIG. 3 is a block diagram that depicts example components of printing device installation module.

The printing device installation module 218 allows user to manage a Preferred Printer List (PP List). The user can add a printing device either by supplying an IP address of a printing device or by selecting a printing device from a list of printing devices that have been discovered. FIG. 3 is a block diagram that depicts example components of printing device installation module 218. A common preferred printer list UI module 302 generates a user interface that allows a user to manage a PP list. A user may add, discover, delete and update device connection status through this user interface. Once a printing device has been added to the PP list, the WSPD 114 saves the corresponding information for the printing device so that it can be retrieved and used at a later time. A network printer discovery module 304 discovers printing devices on a network, using, for example, Bonjour, WS-Discovery, SNMP Multicast or other printing device discovery protocols. A network printer verification module 306 verifies that a printing device with a specified IP Address is currently connected and with the specified model name.

B. Custom Property Sheets Module

The custom property sheets module 220 is responsible for creating and displaying a user interface with all the features and options defined in the PDD Data 212. This module is also responsible for applying constrains between features and options. This module reads the PDD data from printing device's registry, parses the information, and helps the UI configuration module 202 build a user interface dialog box that displays all of the features and options for a particular printing device. This may include, for example, differentiating between data in the PDD data that is used for processing documents and data in the PDD data that is related to control features of a printing device.

C. Capability Service Query Module

The capability service query module 214 queries Web print services 116, and in particular capability service 215, for the printing device capability data for a printing device. Any type of query methodology may be used, for example, SNMP.

D. Semantic Capability Parser

The semantic capability parser module 216 parses the printing device capability data for a printing device into PDD data 212 and then saves the parsed results to the registry. PDD data 212 may be stored and maintained in a variety of formats, depending upon a particular implementation. According to one embodiment of the invention, PDD data 212 is maintained in an XML data structure that describes all feature information supported by current printing device. PDD data 212 also specifies constraints for features and options. PDD data 212 may be updated by Auto-Config/Upgrade module 228 after detection of a printing device feature configuration change event and receipt of updated printing device capability data. The following is an example PDD Data XML Data Structure that includes a device feature section and a global constraints section:

```
<PrinterDescriptionDataDevice="Future Printer">
    <DeviceFeatures>...
    </DeviceFeatures>
        .
        .
    <GlobalConstraints>...
    </GlobalConstraints>
</PrinterDescriptionData>
Each "<DeviceFeatures>" records a device feature information in
following format:
<DeviceFeatureValue="Finisher"PrinterProperty="true">
<DisplayNamexml:lang="en-US">Finisher</DisplayName>
<DefaultOption>NotInstalled</DefaultOption>
<FeatureOptionValue="NotInstalled">
    <DisplayNamexml:lang="en-US">Not Installed</DisplayName>
    <Constraints>
        <ConstraintFeature="OutputBins"Option="FinisherUpperTray"/>
    </Constraints>
    <DisabledFeaturesValueType="LIST">
        <DisabledFeatureValue="Staple"/>
    </DisabledFeatures>
</FeatureOption>
<FeatureOptionValue="FinisherSR790">
    <DisplayNamexml:lang="en-US">Finisher SR790</DisplayName>
</FeatureOption>
<FeatureOptionValue="FinisherSR3030">
    <DisplayNamexml:lang="en-US">Finisher SR3030</DisplayName>
</FeatureOption>
</DeviceFeature>
In PDD, Section  "<GlobalConstraints>" contains feature or option
constraint.
<GlobalConstraints>
<InvalidCombinations>
<InvalidCombinationFeature="InputBins"Option="Tray1"/>
<InvalidCombinationFeature="MediaType"Option="TRANSPARENCY"/>
</InvalidCombinations>
</GlobalConstraints>
```

E. DEVMODE Generation and Validation Module

Figure 4:
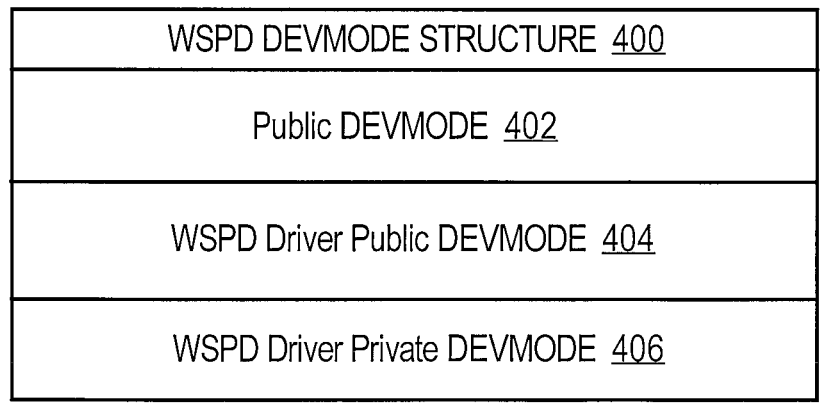
FIG. 4 is a block diagram that depicts an example WSPD DEVMODE structure.

The DEVMODE generation and validation module 224 creates a default DEVMODE structure for a specific printing device model and validates and converts different versions of DEVMODE into WSPD DEVMODE. The default DEVMODE structure is used when DEVMODE generation and validation module 224 detects an invalid setting from incoming DEVMODE. In this situation, DEVMODE generation and validation module 224 replaces the invalid setting with the corresponding value from the default DEVMODE structure. FIG. 4 is a block diagram that depicts an example WSPD DEVMODE structure 400 that includes public DEVMODE 402, WSPD driver public DEVMODE 404 and WSPD driver private DEVMODE 406. Public DEVMODE is a fixed data structure defined by Microsoft. Any feature is set to default value if that feature appears in public DEVMODE but is not supported by a printing device. WSPD driver public DEVMODE 404 contains settings for printing device features defined in core driver GPD file 208 that are common to all printing devices. Microsoft UNIDRVUI.dll driver manages WSPD driver public DEVMODE 404. To access any data defined in WSPD driver public DEVMODE 404, WSPD 114 calls helper functions provided by Microsoft. Under Windows XP, helper functions are very limited for UI configuration module 202 and a separate module is helpful to parse and access core driver GPD file 208 features. WSPD driver private DEVMODE 406 contains settings for features that are supported by a particular printing device and it is managed by UI configuration module 202. WSPD driver private DEVMODE 406 is generated based on PDD data 212 that is saved in the WSPD 114 registry. WSPD driver private DEVMODE 406 may be in XML format and it may be extendable, depending on the feature set supported by the printing device. Example WSPD DEVMODE data is:

```
<SODSPDevMode>
<WSPDDevmodeVersion>
{767BADA7-2956-4C0E-A5D3-F3021203C7DB}
</WSPDDevmodeVersion>
<InputTray3>NotInstalled</InputTray3>
<InputTray4>NotInstalled</InputTray4>
<LCTDetail>NotInstalled</LCTDetail>
<Tray3LCT>NotInstalled</Tray3LCT>
<Finisher>NotInstalled</Finisher>
<HolePunchUnit>NotInstalled</HolePunchUnit>
<MediaSizeName>na_letter_8.5x11in</MediaSizeName>
<MediaType>Auto</MediaType>
<InputBins>AUTO</InputBins>
<SlipSheet>OFF</SlipSheet>
<SlipSheetInputBin>Bypass</SlipSheetInputBin>
<OutputBins>PrinterDefault</OutputBins>
<Staple>OFF</Staple>
<HolePunch>OFF</HolePunch>
<Orientation>Portrait </Orientation>
<Sides>OneSided</Sides>
<EdgeToEdgePrint>OFF</EdgeToEdgePrint>
<Resolution>600</Resolution>
<PrintDensity>EconomodeOff</PrintDensity>
<PrintQuality>SmoothingOff</PrintQuality>
<RAM>65536KB</RAM>
<Memory_HardDisk>256MB_NotInstalled</Memory_HardDisk>
<PagesPerSheet>1</PagesPerSheet>
<Direction>RightDown</Direction>
<Collate>false</Collate>
<Support8CharPassword>ON</Support8CharPassword>
<SupportDocUiReplace>ON</SupportDocUiReplace>
<AutoConfig>ON</AutoConfig>
<SupportSamplePrint>ON</SupportSamplePrint>
<SupportSecurePrint>ON</SupportSecurePrint>
<SupportHoldPrint>ON</SupportHoldPrint>
<SupportStoredPrint>ON</SupportStoredPrint>
<SupportStoreandPrint>ON</SupportStoreandPrint>
<SupportSupplyView>ON</SupportSupplyView>
<SupportAccessRole>ON</SupportAccessRole>
</SODSPDevMode>
```

F. Preferred Printer List (PP List) UI Management Module

The preferred printer list (PP List) UI management module 226 provides a list of printing devices that have been previously used by the current user. The PP List may be organized by location or printing device model name. This module is responsible for displaying, organizing and managing the PP list.

G. Auto-Configure/Upgrade Module

Settings of some printing features (such as finisher trays) depend on the attachment (or detachment) of the physical component. The user interface needs to change to reflect changes of these physical components. The auto-configure/upgrade module 228 module is responsible for querying printing devices and updating the feature settings in user interface. If requested by user, this module can update the entire driver with a newer version downloaded from a Web site. The capabilities of a printing device may be provided by a printing device in a device capability data structure in XML format that conforms, for example, to the schema specification defined by "Web Services on Devices."

H. Print Schema Provider

As per the Microsoft XPSDry specification, the user settings for a print job (XPS document) must be embedded as a Print ticket (Microsoft PrintSchema format) into the print job. Later in the rendering plug-in (XPSDrv), the print ticket is used by the rendering plug-in to manipulate the job for printing the data with appropriate print settings.

VII. Components of Rendering Filter Pipeline

Rendering Filter Pipeline 204 is part of WSPD 114 and is installed with other modules to work with Microsoft XpsDry printer driver (XpsDrv) and Windows Spooler system. The rendering filter pipeline 204 provides customized rendering services to the device feature and provides the following functionalities for printing under Windows OS:

- Generates, based upon DEVMODE, a job-ticket that is in a format recognized by Web print services 116, and sends the job ticket to Web print services 116, i.e., rendering service 126
- Communicates with rendering service 126 to render application data
- Downloads rendered print data from Web print services 116 and sends the rendered print data to a printing device
- Calls Language monitor functions to verify a printing device defined in print data According to one embodiment of the invention, rendering filter pipeline 204 includes three components: a job ticket generator 232, a rendering request module 234 and a local rasterizer module 236. Job ticket generator 232 generates a job ticket that is used for either local rendering, using the local rasterizer module 236 described hereinafter, or rendering via Web print services 116. FIG. 5 is a table 500 that depicts an example format for a job ticket. The particular format of a job ticket may vary, depending upon the requirements of rendering service 224.

Rendering request module 234 communicates with Web print services 116, sends rendering requests to Web print services 116 and receives rendered print data from Web print services 116. Local rasterizer module 236 provides support for local PDL rendering to allow users to select either local rendering or rendering via Web print services 116, as previously described herein. When using local rendering, all of the features and options supported by a particular printing device may not be available to the user. The standard PDD may be generated from the core driver GPD file and the UI built from the standard PDD. Rendering filter pipeline 204 may also include a DEVMODE generation and validation module that validates and converts different versions of DEVMODE into WSPD DEVMODE.

Rendering filter Pipeline 204 also includes a rendering filter pipeline configuration file that is an XML file that defines the properties of filter(s) used inside the WSPD driver package. Examples of the properties include, without limitation, order of the filters in the pipeline, filter interfaces and input and output formats for each filter.

VIII. Other Components

A. Language Monitor

Language monitor 206 is part of WSPD 114 and installed with other modules to work with the Microsoft XPS printer driver (XpsDrv) and the Windows Spooler 238. Language monitor 206 provides device specific options, such as TCP/IP port management and may be implemented as a user mode DLL. Language monitor 206 communicates with printing device 240 through a Windows TCP/IP port monitor 242. TCP/IP port monitor 242 creates a TCP/IP port (if one does not exist) and redirect a printing device to a newly-created port.

B. Core Driver GPD File

The core driver GPD file 208 includes all necessary directives that can function as aXpsDrvGPD file. These directives include:

- GPD file information, such as "GPDSpecVersion", "GPDFileName", "GPDFileVersion", etc.
- GPD specific directives, such as "Personality", "Include", etc
- Printing device basic attribute, such as "ModelName", "PrintRateUnit", etc.
- Basic printing device feature, such as:
  - PaperSize (Include common paper sizes for all printing devices for this category)
  - MediaType (Only one "Auto" option defined)
  - InputBin (Only one "Auto" option defined)
  - OutputBin (Only one "Auto" option defined)
  - Orientation
  - Collate
  - Resolution (include all printing resolutions for this category)
  - ColorMode (define only if printing device is a color printing device)

UI configuration module 202 provides customized property sheets via the custom property sheets module 220. UI configuration module displays printing device features defined in both the core driver GPD file 208 and in PDD data 212. If a particular feature is defined in both files, UI configuration module 202 provides a superset of options from both sources (Except "Resolution"). For example, suppose that the core driver GPD file 208 defines that the "MediaType" feature only has one option—"AUTO", but the PDD data 212 for a particular printing device specifies that the "MediaType" feature has two other options, namely, "Standard" and "Recycled". In this situation, the UI configuration module 202 displays all three options for the "MediaType" feature. If no PDD data 212 is found in the registry for a particular printing device, then the UI configuration module 202 displays the common features and options from the core driver GPD file 208.

With respect to papersize, UI configuration module 202 displays paper sizes defined in the core driver GPD file 208 in addition to the paper sizes supported by a printing device, as defined in the corresponding PDD data 212. During installation of the WSPD 114, the installation module detects any new paper sizes that are defined by a printing device but not defined in the core driver GPD file 208 and registers those new paper sizes as forms that are saved in the registry.

With respect to resolution, unlike other printer features in the core driver GPD file 208, the "Resolution" feature in the core driver GPD file 208 includes every possible option that all printers can support, e.g., "1200, 600, 300" dpi. If a future printing supports 200 dpi, the core driver GPD file 208 may be updated to add "200" dpi as an option for the "Resolution" feature. UI configuration module 202 may display only the resolutions supported by a particular printing device. The "ColorMode" attribute may be defined in the core driver GPD file 208 only when a particular printing device is a color printing device.

IX. Operational Examples

A. Printing Device Capability Data

Figure 6:
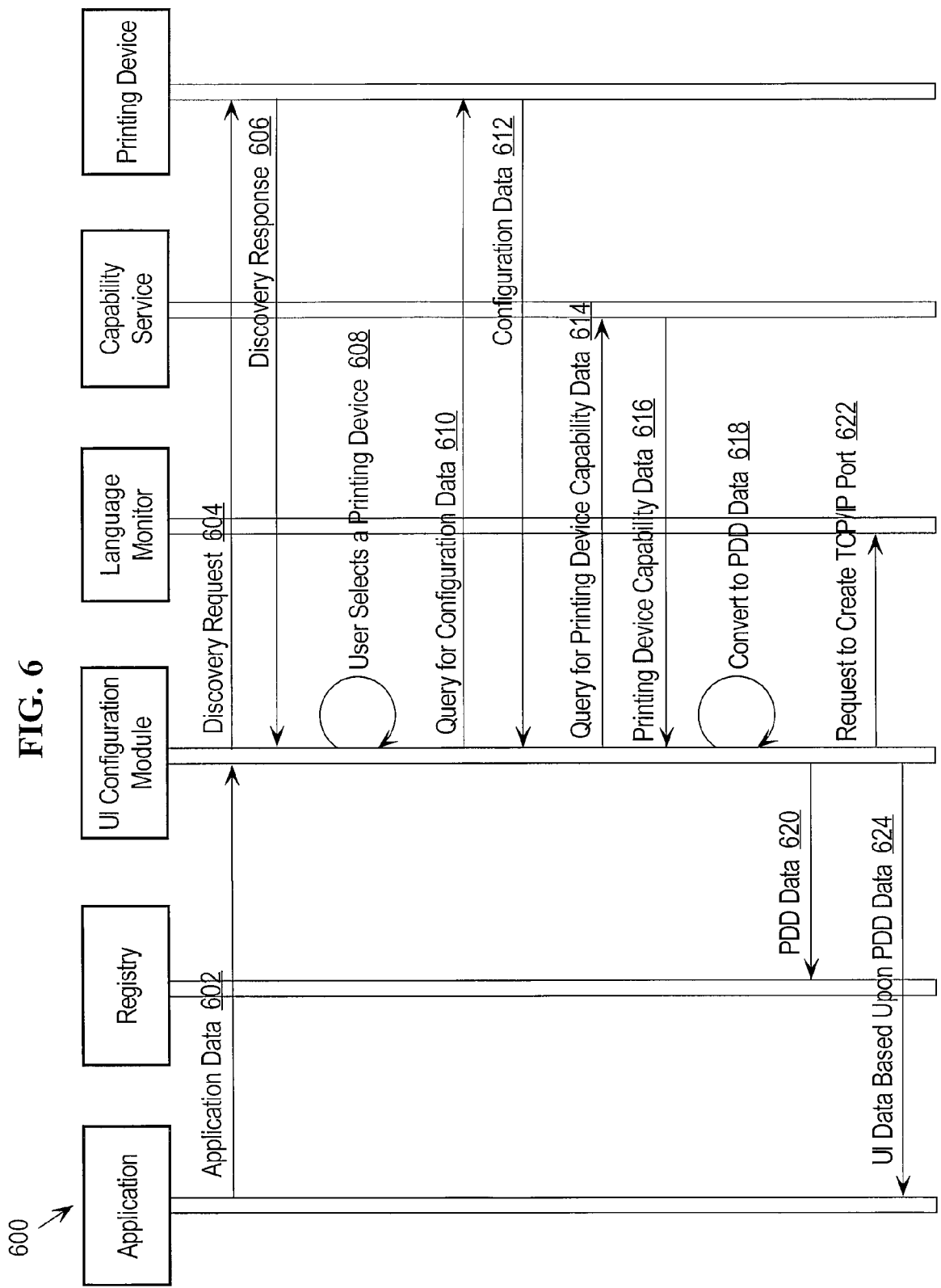
FIG. 6 is a message ladder diagram that depicts the flow of printing device capability data within a system.

FIG. 6 is a message ladder diagram 600 that depicts the flow of printing device capability data within the system 200. In step 602, a user selects to print an electronic document via an application and the application sends application data to the UI configuration module. In step 604, the UI configuration module generates and transmits discovery requests to one or more printing devices. In step 606, the printing devices respond to the discovery requests with discovery responses. The discovery responses may include basic information about the printing devices, for example data that identifies the printing devices. In step 608, the UI configuration module generates and displays GUI objects that indicate the available printing devices and the user selects a printing device. For example, the available printing devices may be displayed in a list and the user may select a printing device from the list. The user may also enter data that identifies a particular printing device. For example, a user may enter the IP address of a particular printing device of interest.

In step 610, the UI configuration module queries the selected printing device for configuration data and in step 612, the selected printing device provides the configuration data to the UI configuration module. The configuration data may indicate, for example, the model of the selected printing device. In step 614, the UI configuration module generates and transmits to the capability service a request for printing device capability data for the selected printing device. In step 616, the capability service provides printing device capability data for the selected printing device to the UI configuration module. In step 618, the UI configuration module processes the printing device configuration data and generates PDD data. In step 620, the UI configuration module stores the PDD data into the registry. PPD data may be retrieved and reused when printing devices are subsequently selected by a user, for example, via the PP List. The device capability data does not need to be saved. Once the PDD data is generated, it is saved in the registry and is used to build the UI whenever that particular printer is selected. In step 622, the UI configuration module requests that the language monitor create a TCP/IP port for the selected printing device. In step 624, the UI configuration module generates and transmits to the application, user interface data based upon the PDD data. When processed by the application, the user interface data displays the options and features of the selected printing device.

B. Rendering Print Data Using Web Print Services

FIG. 7 is a message ladder diagram 700 that depicts the flow of messages during the rendering of print data using Web print services. In step 702, in response to a user selecting to print an electronic document, the application invokes the spooler to render the print data, which in turn invokes and provides application data to the rendering filter pipeline. In step 704, the rendering filter pipeline generates and transmits to the language monitor a request to verify the TCP/IP port and the printing device. In step 706, the language monitor verifies the printing device, which may include, for example, using SNMP to verify that the printing device is the same type/model as the printing device specified in the application data. In step 708, the language monitor generates and transmits a verification response to the rendering filter pipeline to indicate whether the verification of the TCP/IP port and printing device was successful. Assuming that the verification was successful, then in step 710, the rendering filter pipeline creates a job ticket as previously described herein. In step 712, the rendering filter pipeline transmits the job ticket and the application data to the rendering service with a request to render the print data in the PDL supported by the selected printing device. In step 714, the rendering service renders the print data and returns the rendered print data to the rendering filter pipeline. In step 716, the rendering filter pipeline transmits the rendered print data to the selected printing device. This may be done, for example, by providing the rendered print data with the IP address of the printing device that was selected by the user via the user interface to the language monitor which redirects the rendered print data to the selected printing device. UI configuration module 202 may store and provide the IP address of the selected printing device to the rendering filter pipeline 204.

X. Example Interfaces

FIG. 8 depicts example APIs used by WSPD 114 to access Web print services 116. The APIs define a set of HTTP request messages along with a definition of the structure of response messages, expressed in JSON or XML.

XI. Implementation Mechanisms

According to one embodiment of the invention, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

FIG. 9 is a block diagram that depicts an example computer system 900 upon which embodiments of the invention may be implemented. Computer system 900 includes a bus 902 or other communication mechanism for communicating information, and a processor 904 coupled with bus 902 for processing information. Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic or computer software which, in combination with the computer system, causes or programs computer system 900 to be a special-purpose machine. According to one embodiment of the invention, those techniques are performed by computer system 900 in response to processor 904 executing one or more sequences of one or more instructions contained in main memory 906. Such instructions may be read into main memory 906 from another computer-readable medium, such as storage device 910. Execution of the sequences of instructions contained in main memory 906 causes processor 904 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing data that causes a computer to operation in a specific manner. In an embodiment implemented using computer system 900, various computer-readable media are involved, for example, in providing instructions to processor 904 for execution. Such a medium may take many forms, including but not limited to, non-volatile media and volatile media. Non-volatile media includes, for example, optical or magnetic disks, such as storage device 910. Volatile media includes dynamic memory, such as main memory 906. Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or memory cartridge, or any other medium from which a computer can read.

Various forms of computer-readable media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918. The received code may be executed by processor 904 as it is received, and/or stored in storage device 910, or other non-volatile storage for later execution.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for printing an electronic document, the computer-implemented method comprising:

a printer driver on a client device receiving application data from an application program;

the printer driver on the client device retrieving, from one or more Web print services that are separate from both the client device and a specified printing device, via the one or more networks, printing device capability data that indicates one or more features and options currently supported by the specified printing device;

the printer driver on the client device generating, based upon printing device capability data and user selection data that indicates user selections of one or more features and options of the specified printing device, a job ticket that specifies how an electronic document represented in the application data is to be printed at the specified printing device;

the printer driver on the client device transmitting the job ticket and the application data to the one or more Web print services that are separate from both the client device and the specified printing device, via the one or more networks, wherein the one or more Web print services that are separate from both the client device and the specified printing device use the job ticket to render the application data and generate print data in a format supported by the specified printing device;

the printer driver on the client device receiving via the one or more networks the print data from the one or more Web print services that are separate from both the client device and a specified printing device; and the printer driver on the client device causing the print data to be transmitted to the specified printing device via the one or more networks, wherein processing of the print data at the specified printing device causes a printed version of the electronic document to be generated.

2. The computer-implemented method of claim 1, further comprising:

the printer driver on the client device retrieving, from the specified printing device via the one or more networks, printing device capability data that indicates one or more features and options currently supported by the specified printing device;

the printer driver on the client device generating, based upon the printing device capability data, one or more graphical user interface objects that visually depict the one or more features and options currently supported by the specified printing device; and the printer driver on the client device causing the one or more graphical user interface objects to be displayed on a user interface.

3. The computer-implemented method of claim 1, wherein:

the application data is first application data, the print data is first print data, and the computer-implemented method further comprises:

the printer driver on the client device receiving second application data that is different than the first application data;

the printer driver on the client device rendering the second application data and generating second print data in the format supported by the specified printing device; and the printer driver on the client device causing the second print data to be transmitted to the specified printing device via the one or more networks, wherein processing of the second print data at the specified printing device causes a printed version of a second electronic document to be generated.

4. The computer-implemented method of claim 1, further comprising:

the printer driver on the client device generating and transmitting via the one or more networks one or more discovery requests;

the printer driver on the client device receiving via the one or more networks a discovery response from the specified printing device;

the printer driver on the client device retrieving, from the specified printing device via the one or more networks, configuration data that specifies one or more attributes of the specified printing device;

the printer driver on the client device transmitting via the one or more networks to the one or more Web print services that are separate from both the client device and the specified printing device a request for device capability data that indicates one or more features and options currently supported by the specified printing device, wherein the request includes one or more of the one or more attributes of the specified printing device specified by the configuration data; and the printer driver on the client device receiving via the one or more networks the device capability data from the one or more Web print services that are separate from both the client device and the specified printing device.

5. The computer-implemented method of claim 1, wherein the one or more Web print services include at least:

a capability service configured to supply to the printer driver on the client device via the one or more networks device capability data that indicates one or more features and options currently supported by the specified printing device; and a rendering service configured to render the application data and generate the print data in the format supported by a specified printing device.

6. The computer-implemented method of claim 1, wherein:

the specified printing device is a first specified printing device, the format supported by the first specified printing device is a first format, the application data is first application data, the print data is first print data, the electronic document is a first electronic document, and the computer-implemented method further comprises:

a printer driver on the client device receiving second application data that is different than the first application data;

the printer driver on the client device causing the second application data to be transmitted via the one or more networks to the one or more Web print services that are separate from both the client device and the specified printing device and that render the second application data and generate second print data in a second format supported by a second specified printing device that is different than the first specified printing device, the second format being different than the first format;

the printer driver on the client device receiving via the one or more networks the second print data from the one or more Web print services that are separate from both the client device and the specified printing device; and the printer driver on the client device causing the second print data to be transmitted via the one or more networks to the second specified printing device, wherein processing of the second print data at the second specified printing device causes a printed version of a second electronic document to be generated.

7. One or more non-transitory computer-readable media storing instructions which, when processed by one or more processors, cause:

a printer driver on a client device receiving application data from an application program;

the printer driver on the client device retrieving, from one or more Web print services that are separate from both the client device and a specified printing device, via the one or more networks, printing device capability data that indicates one or more features and options currently supported by the specified printing device;

the printer driver on the client device generating, based upon printing device capability data and user selection data that indicates user selections of one or more features and option of the specified printing device, a job ticket that specifies how an electronic document represented in the application data is to be printed at the specified printing device;

the printer driver on the client device transmitting the job ticket and the application data to the one or more Web print services that are separate from both the client device and the specified printing device, via the one or more networks, wherein the one or more Web print services that are separate from both the client device and the specified printing device use the job ticket to render the application data and generate print data in a format supported by the specified printing device;

the printer driver on the client device receiving via the one or more networks the print data from the one or more Web print services that are separate from both the client device and a specified printing device; and the printer driver on the client device causing the print data to be transmitted to the specified printing device via the one or more networks, wherein processing of the print data at the specified printing device causes a printed version of the electronic document to be generated.

8. The one or more non-transitory computer-readable media of claim 7, further storing additional instructions which, when processed by the one or more processors, cause:

the printer driver on the client device retrieving, from the specified printing device via the one or more networks, printing device capability data that indicates one or more features and options currently supported by the specified printing device;

the printer driver on the client device generating, based upon the printing device capability data, one or more graphical user interface objects that visually depict the one or more features and options currently supported by the specified printing device; and the printer driver on the client device causing the one or more graphical user interface objects to be displayed on a user interface.

9. The one or more non-transitory computer-readable media of claim 7, wherein:

the application data is first application data, the print data is first print data, and the non-transitory computer-readable medium further comprises additional instructions which, when processed by the one or more processors, cause:

the printer driver on the client device receiving second application data that is different than the first application data;

the printer driver on the client device rendering the second application data and generating second print data in a format supported by the specified printing device; and the printer driver on the client device causing the second print data to be transmitted to the specified printing device via the one or more networks, wherein processing of the second print data at the specified printing device causes a printed version of a second electronic document to be generated.

10. The one or more non-transitory computer-readable media of claim 7, further storing additional instructions which, when processed by the one or more processors, cause:

the printer driver on the client device generating and transmitting via the one or more networks one or more discovery requests;

the printer driver on the client device receiving via the one or more networks a discovery response from the specified printing device;

the printer driver on the client device retrieving, from the specified printing device via the one or more networks, configuration data that specifies one or more attributes of the specified printing device;

the printer driver on the client device transmitting via the one or more networks to the one or more Web print services that are separate from both the client device and the specified printing device a request for device capability data that indicates one or more features and options currently supported by the specified printing device, wherein the request includes one or more of the one or more attributes of the specified printing device specified by the configuration data; and the printer driver on the client device receiving via the one or more networks the device capability data from the one or more Web print services that are separate from both the client device and the specified printing device.

11. The one or more non-transitory computer-readable media of claim 7, wherein the one or more Web print services include at least:

a capability service configured to supply to the printer driver on the client device via the one or more networks device capability data that indicates one or more features and options currently supported by the specified printing device; and a rendering service configured to render the application data and generate the print data in the format supported by a specified printing device.

12. The one or more non-transitory computer-readable media of claim 7, wherein:

the specified printing device is a first specified printing device, the format supported by the first specified printing device is a first format, the application data is first application data, the print data is first print data, the electronic document is a first electronic document, and the non-transitory computer-readable medium further comprises additional instructions which, when processed by the one or more processors, cause:

a printer driver on the client device receiving second application data that is different than the first application data;

the printer driver on the client device causing the second application data to be transmitted via the one or more networks to the one or more Web print services that are separate from both the client device and the specified printing device and that render the second application data and generate second print data in a second format supported by a second specified printing device that is different than the first specified printing device, the second format being different than the first format;

the printer driver on the client device receiving via the one or more networks the second print data from the one or more Web print services that are separate from both the client device and the specified printing device; and the printer driver on the client device causing the second print data to be transmitted via the one or more networks to the second specified printing device, wherein processing of the second print data at the second specified printing device causes a printed version of a second electronic document to be generated.

13. An apparatus comprising:

a discovery module configured to:

discover a printing device on one or more networks, and retrieve, from the printing device, configuration data that specifies one or more attributes of the printing device;

wherein the apparatus is configured to:

transmit, via the one or more networks, at least a portion of the configuration data to one or more Web print services that are separate from both the apparatus and the printing device, and retrieve, via the one or more networks from the one or more Web print services that are separate from both the apparatus and the printing device, printing device capability data that indicates one or more features and options currently supported by the printing device;

a job ticket generation module configured to generate, based upon the printing device capability data and user selection data that indicates one or more features and options selected by a user, a job ticket that specifies how an electronic document represented by application data is to be printed at the printing device; and wherein the apparatus is further configured to:

transmit via the one or more networks the application data and the job ticket to the one or more Web print services that are separate from both the apparatus and the printing device and that render the application data and generate print data in a format supported by the printing device, receive the print data from the one or more Web print services that are separate from both the apparatus and the printing device via the one or more networks, and transmit the print data to the printing device.

14. The apparatus of claim 13, further comprising:

a user interface module configured to generate, based upon the printing device capability data, one or more graphical user interface objects that visually depict the one or more features and options currently supported by the printing device; and cause the one or more graphical user interface objects to be displayed on a user interface.

15. The apparatus of claim 13, wherein:

the application data is first application data, the print data is first print data, and the apparatus further comprises a local rendering module configured to render second application data and generate second print data in the format supported by the printing device; and wherein the apparatus is further configured to cause the second print data to be transmitted to the printing device, wherein processing of the second print data at the printing device causes a printed version of a second electronic document represented by the second application data to be generated.

16. The apparatus of claim 13, wherein the one or more Web print services include at least:

a capability service configured to supply to the apparatus via the one or more networks device capability data that indicates one or more features and options currently supported by the printing device; and a rendering service configured to render the application data and generate the print data in the format supported by the printing device.

17. The apparatus of claim 13, wherein:

the printing device is a first printing device, the configuration data is first configuration data, the printing device capability data is first printing device capability data, the user selection data is first user selection data, the job ticket is a first job ticket, the discovery module is further configured to:

discover a second printing device on the network that is different than the first printing device, and retrieve, from the second printing device, second configuration data that specifies one or more attributes of the second printing device;

the apparatus is configured to:

transmit, via the one or more networks, at least a portion of the second configuration data to the one or more Web print services that are separate from both the apparatus and the specified printing device, and retrieve, via the one or more networks from the one or more Web print services that are separate from both the apparatus and the specified printing device, second printing device capability data that indicates one or more features and options currently supported by the second printing device;

the job ticket generation module is further configured to generate, based upon the second printing device capability data and second user selection data that indicates one or more other features and options selected by a user, a second job ticket that specifies how a second electronic document is to be printed at the second printing device; and the apparatus is further configured to:

transmit via the one or more networks both second application data that represents the second electronic document and the second job ticket to the one or more Web print services that are separate from both the apparatus and the specified printing device and that render the second application data and generate second print data in a format supported by the second printing device, receive the second print data from the one or more Web print services that are separate from both the apparatus and the specified printing device via the one or more networks, and transmit the second print data to the second printing device.

18. The apparatus of claim 13, wherein the discovery module is further configured to:

transmit via the one or more networks one or more discovery requests, receive via the one or more networks a discovery response from the printing device, and generate and transmit to the printing device via the one or more networks a request for the configuration data.

* * * * *